US011254039B2

(12) United States Patent
Overfield et al.

(10) Patent No.: US 11,254,039 B2
(45) Date of Patent: Feb. 22, 2022

(54) APPARATUS AND METHOD FOR HEATING A SIDE GATE NOZZLE

(71) Applicant: HUSKY INJECTION MOLDING SYSTEMS, LTD., Bolton (CA)

(72) Inventors: Sarah Kathleen Overfield, Colchester, VT (US); Edward Joseph Jenko, Essex, VT (US); Brian Esser, Colchester, VT (US); David Albert Hurley, Burlington, VT (US)

(73) Assignee: HUSKY INJECTION MOLDING SYSTEMS LTD., Bolton (CA)

( * ) Notice: Subject to any disclaimer, the term of this patent is extended or adjusted under 35 U.S.C. 154(b) by 356 days.

(21) Appl. No.: 16/340,398

(22) PCT Filed: Oct. 9, 2017

(86) PCT No.: PCT/US2017/055683
§ 371 (c)(1),
(2) Date: Apr. 9, 2019

(87) PCT Pub. No.: WO2018/075272
PCT Pub. Date: Apr. 26, 2018

(65) Prior Publication Data
US 2019/0224896 A1   Jul. 25, 2019

Related U.S. Application Data

(60) Provisional application No. 62/409,027, filed on Oct. 17, 2016.

(51) Int. Cl.
*B29C 45/27* (2006.01)
*B29C 45/78* (2006.01)

(52) U.S. Cl.
CPC ...... *B29C 45/2708* (2013.01); *B29C 45/2735* (2013.01); *B29C 45/2737* (2013.01);
(Continued)

(58) Field of Classification Search
CPC .......... B29C 45/2708; B29C 45/2737; B29C 45/2735; B29C 45/78; B29C 2045/2754;
(Continued)

(56) References Cited

U.S. PATENT DOCUMENTS 3,221,144 A * 11/1965 Kamide ............. G05D 23/1906
219/489
5,518,389 A * 5/1996 Nonomura .............. B29C 45/27
264/40.6
(Continued)

FOREIGN PATENT DOCUMENTS

CN       105500631 A    4/2016
DE   1020122111141 A1   1/2014

OTHER PUBLICATIONS

PCT International Search Report, Young, Lee W; dated Dec. 28, 2017; 3 pages.

*Primary Examiner* — Nahida Sultana (57) ABSTRACT

An injection molding machine includes an edge gate nozzle with a nozzle body having a primary melt channel and a nozzle head having first and second secondary melt channels that feed melt to first and second nozzle tips. First and second heaters are disposed in the nozzle head to provide heat to the secondary melt channels. In some embodiments, the heaters are positioned adjacent to the secondary melt channels, with first heater is closer to the first secondary melt channel than to the second secondary melt channel. In some embodiments, the heaters are positioned adjacent to the nozzle tips, with the first heater closer to the first nozzle tip than to the second nozzle tip. In some embodiments, each heater is adjacent to both the respective nozzle tip and secondary melt channel. In some embodiments, each heater is individually controllable.

18 Claims, 8 Drawing Sheets

(52) U.S. Cl.
CPC ...... *B29C 45/78* (2013.01); *B29C 2045/2754* (2013.01); *B29C 2945/7604* (2013.01); *B29C 2945/76277* (2013.01); *B29C 2945/76531* (2013.01); *B29C 2945/76755* (2013.01)

(58) Field of Classification Search
CPC .. B29C 2945/7604; B29C 2945/76277; B29C 2945/76531; B29C 2945/76755
See application file for complete search history.

(56) References Cited

U.S. PATENT DOCUMENTS

| | | | |
|---|---|---|---|
| 5,952,016 A * | 9/1999 | Gellert | B29C 45/2735 425/190 |
| 2002/0098262 A1 | 7/2002 | Babin | |
| 2005/0109767 A1* | 5/2005 | Fennewald | H05B 3/42 219/543 |
| 2008/0152752 A1 | 6/2008 | Klobucar et al. | |
| 2008/0317898 A1* | 12/2008 | Fairy | B29C 45/2806 425/549 |
| 2013/0287884 A1* | 10/2013 | Jenko | B29C 45/74 425/549 |
| 2014/0127348 A1* | 5/2014 | Baumann | B29C 45/278 425/568 |
| 2017/0144351 A1* | 5/2017 | Tan | B29C 45/7331 |
| 2017/0259481 A1* | 9/2017 | Slisse | B29C 45/2737 |

* cited by examiner

APPARATUS AND METHOD FOR HEATING A SIDE GATE NOZZLE

FIELD

The disclosed embodiments are generally directed to injection molding machines and more particularly to arrangements suitable for heating melt in edge gated nozzles (also referred to as side gated nozzles).

BACKGROUND

Injection molding machines are used to produce plastic molded parts. Typically, hot runners include a manifold that delivers hot melt from a sprue bushing to one or more nozzles, which, in turn, deliver the melt to individual mold cavities.

As is known, it is desirable to provide each mold cavity of an injection molding machine with "balanced" melt, or melt with substantially the same temperature, substantially the same flow, and substantially the same shear effect. Unfortunately, as melt flow splits as the melt travels through the various flow channels, one side or area of the melt flow may be relatively hot and another side of the area may be cold. This may result in a non-homogenous thermal profile in the melt before melt enters the mold cavities. Such non-homogeneity also may be non-uniform across the channels and nozzles. For example, some channels and/or nozzles witness higher melt temperatures than others, resulting an imbalance across the hot runner. Such an imbalance may lead to reduced productivity and poor quality parts.

SUMMARY

According to one embodiment, a side gate nozzle used in a hot runner for transferring melt to a mold cavity is disclosed. The side gate nozzle comprises a nozzle body having a primary melt, a nozzle head having a first secondary melt channel arranged to feed melt to a first nozzle tip and a second secondary melt channel arranged to feed melt to a second nozzle tip, each of the first and second nozzle tips being fluidly connected to the nozzle head, and two or more heaters disposed in the nozzle head, wherein a first heater is adjacent to the first secondary melt channel and a second heater is adjacent to the second secondary melt channel, the first heater being positioned closer to the first secondary melt channel than to the second secondary melt channel.

According to another embodiment, a side gate nozzle used in a hot runner for transferring melt to a mold cavity is disclosed. The side gate nozzle comprises a nozzle body having a primary melt channel, a nozzle head having a first secondary melt channel arranged to feed melt to a first nozzle tip and a second secondary melt channel arranged to feed melt to a second nozzle tip, each of the first and second nozzle tips being fluidly connected to the nozzle head, and two or more heaters disposed in the nozzle head, wherein a first heater is adjacent to the first nozzle tip and a second heater is adjacent to the secondary nozzle tip, the first heater being positioned closer to the first nozzle tip than to the second nozzle tip.

A side gate nozzle used in a hot runner for transferring melt to a mold cavity are disclosed. The side gate nozzle comprises a nozzle body having a primary melt channel, a nozzle head having a first secondary melt channel arranged to feed melt to a first nozzle tip and a second secondary melt channel arranged to feed melt to a second nozzle tip, each of the first and second nozzle tips being fluidly connected to the nozzle head, and two or more heaters disposed in the nozzle head, wherein a first heater is associated with the first nozzle tip and the second heater is associated with the second nozzle tip. The first and second heaters are operatively connected to one or more controllers such that the first and second heaters are individually controllable.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
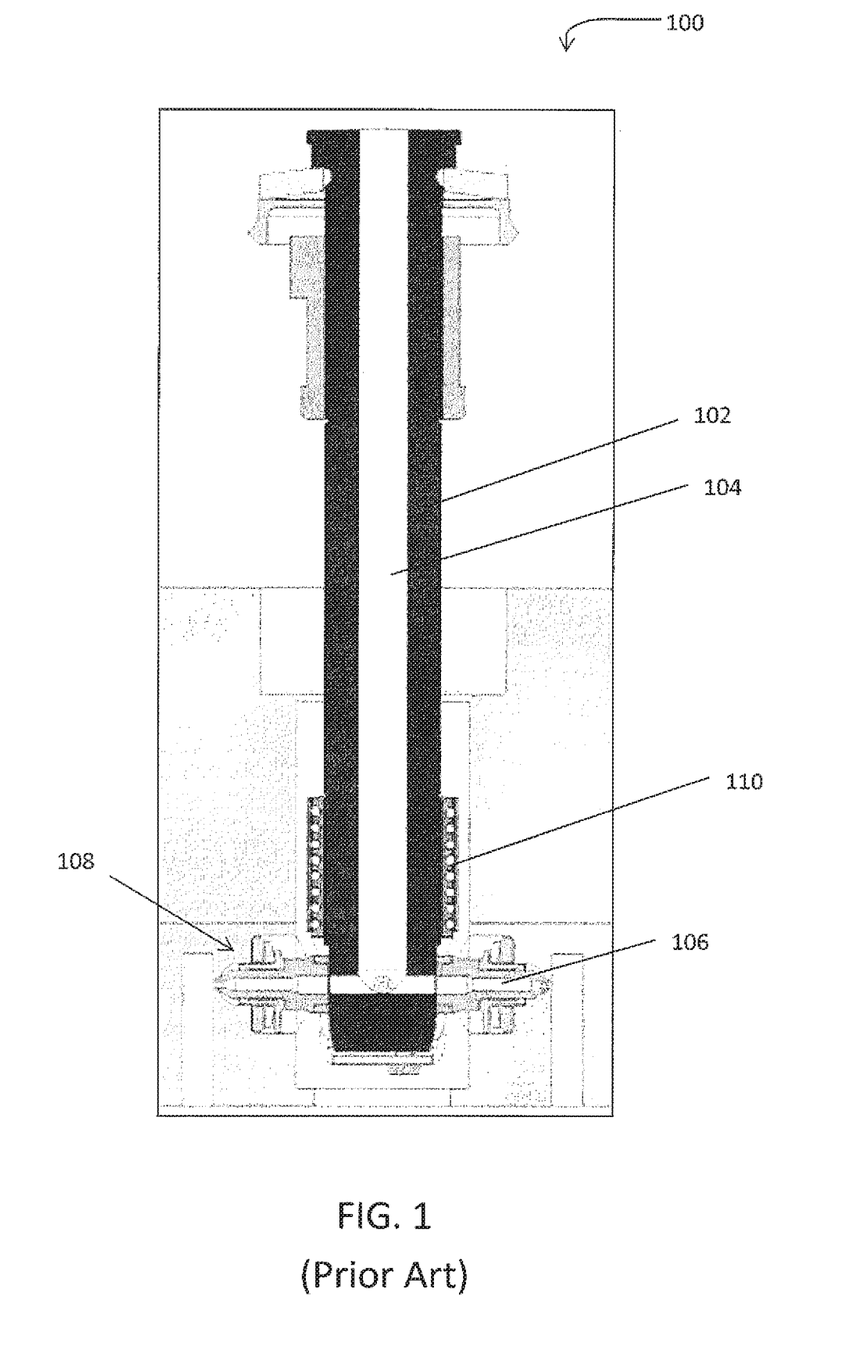
FIG. 1 is a cross-sectional schematic representation of a side gate nozzle according to the prior art.

Injection molding machines are used to produce plastic parts, such as, for example, preforms that are blow molded into beverage containers. Typically, such injection molding machines include a manifold that passes melted molding material, also referred to as melt, to nozzles that, in turn, pass the melt to mold cavities. Some hot runners include edge or side gate nozzles, each of which have a plurality of nozzle tips arranged in a cluster. Each nozzle tip is fluidly connected to a nozzle body and manifold, and receives melt that is passed to a respective mold cavity. For example, as shown in FIG. 1, one such side gate nozzle 100 may include a nozzle housing 102 with a melt bore or primary melt channel 104 formed therein, the primary melt channel 104 being fluidly connected to secondary melt channels 106 that end in the nozzle tips 108.

As is known, it is desirable to provide balanced melt to each mold cavity of the injection molding machine. For example, if the temperature of the melt is too low, the melt may freeze prior to entering the mold cavity. Conversely, if the temperature of the melt is too high, the melt may degrade before even reaching the mold cavity. Additionally, as melt travels through the hot runner, because the melt is thermally insulative and because melt flow splits as melt travels through the various flow channels, one side or area of the melt flow may have a lower temperature. This may result in a non-homogeneous thermal profile of the melt before entry into the mold. Such non-homogeneity also may be non-uniform across all channels, nozzles and nozzle tips, which may result in an imbalance across the hot runner. Such an imbalance is undesirable and may lead to reduced productivity and poor quality parts.

Typically, melt travelling through an edge gate nozzle is heated as the melt is traveling through the primary melt channel in the nozzle housing, before the melt splits and travels through downstream melt channels to the nozzle tips. For example, as shown in FIG. 1, a heater 110 is disposed around a downstream end of the nozzle housing 102, providing heat to melt in the downstream end of the primary melt channel 104 before splitting into two secondary melt channels 106 that end in the nozzle tips 108.

Applicant has recognized that by directly heating melt travelling in the downstream melt channels (e.g., secondary and tertiary melt channels) and in the nozzle tips, various advantages may be realized. Applicant has further recognized that advantages may be realized if the heaters used to adjust tip temperature (e.g., by providing heat to such downstream channels and/or to the nozzle tip) are individually controllable and/or if a temperature of the melt in the downstream channels was measurable. For example, if melt travelling to a first nozzle tip (e.g., via a first channel) was at a higher temperature than melt travelling to a second nozzle tip (e.g., via a second channel), more heat may be provided to the second channel than to the first channel. As will be appreciated, such an approach may allow for individual control and balancing of the melt flow to each tip and respective mold cavity.

Embodiments disclosed herein include a hot runner having a side gate nozzle with a primary melt channel fluidly connected to a manifold, downstream melt channels that pass melt from the primary melt channel to the respective nozzle tips, and heaters that are arranged to heat the downstream melt channels and nozzle tips. In some embodiments, a heater may be associated with each downstream channel and/or respective nozzle tip. For example, an edge gate nozzle may have 4 nozzle tips and 4 heaters, with a heater associated with each nozzle tip. In some embodiments, heaters may be positioned locally to the downstream channels and/or the nozzle tips to which melt is transferred. For purposes herein, being positioned locally to a melt channel and respective nozzle tip may mean that the heater is positioned adjacent to the melt channel and nozzle tip. In some embodiments, a first heater is positioned locally to a first melt channel (that transfers melt to a first nozzle tip) when the first heater is positioned closer to the first melt channel than to any other melt channel or tip, such as a second melt channel that transfers melt to a second nozzle tip. As will be appreciated, a first heater also may be associated with a first melt channel and corresponding nozzle tip while being positioned equidistant between the first melt channel and another melt channel transferring melt to another nozzle tip, or between two nozzle tips.

In some embodiments, the nozzle includes a nozzle body and a nozzle head connected thereto. A plurality of heaters may be disposed in the nozzle head, each heater being positioned locally to downstream melt channels formed in the nozzle head and/or the respective nozzle tip. In some embodiments, the nozzle (and heaters) are operatively connected to a controller that is arranged to adjust the heaters to control tip temperature. For example, the controller may provide different levels of heating to the melt travelling in different melt channels. In some embodiments, the nozzle includes one or more sensors, such as thermocouples, to sense melt temperature. In such embodiments, the thermocouples may send feedback including melt temperature information to the controller, which may, in turn, adjust the heaters to provide appropriate heating to the respective melt channels.

Figure 2:
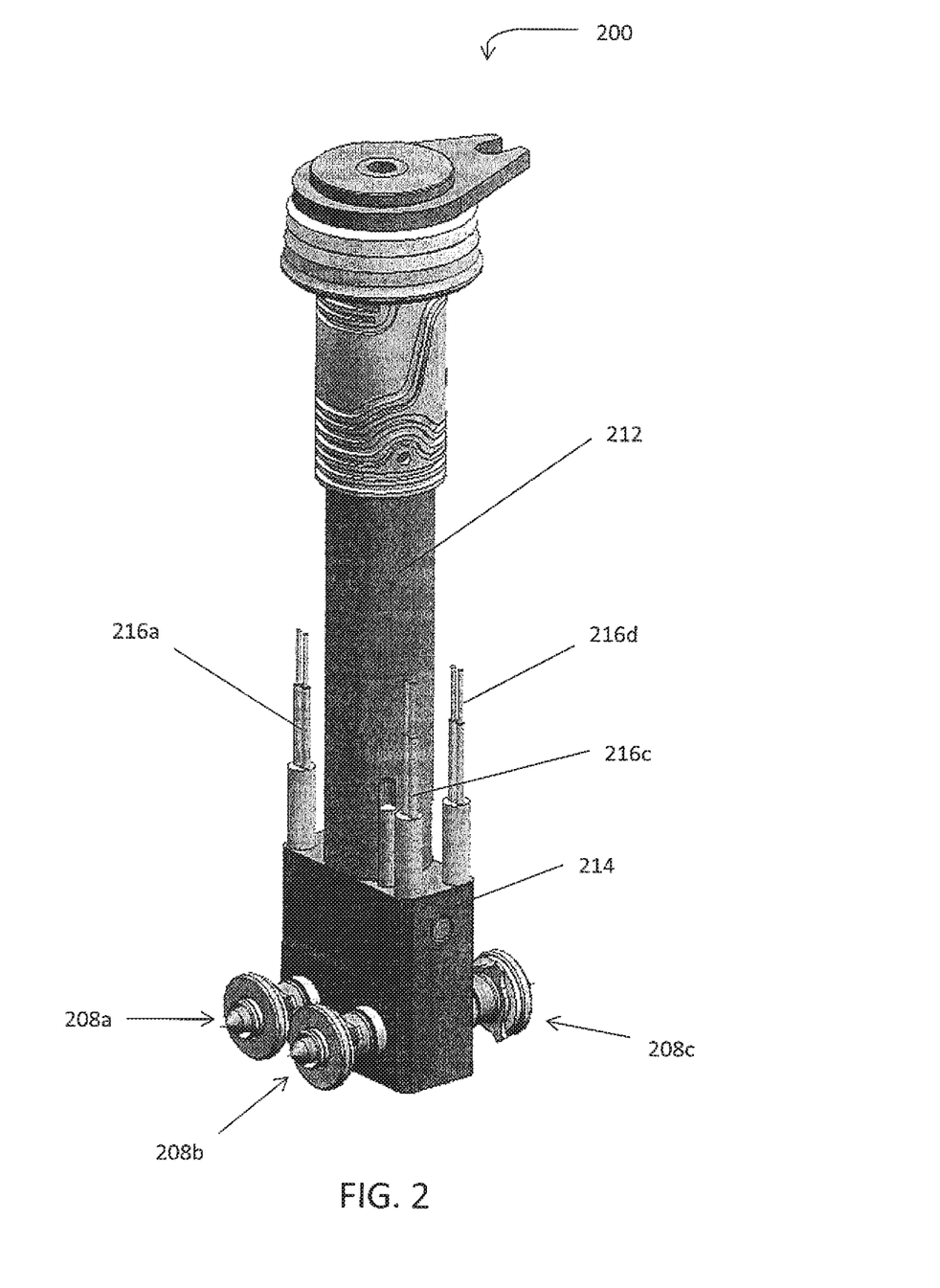
FIG. 2 is a perspective view of a side gate nozzle according to one embodiment of the present disclosure.

Turning now to the figures, FIG. 2 shows an embodiment of a side gate nozzle 200 according to the present disclosure. As shown in this view, the nozzle 200 may include a nozzle body 212 and a nozzle head 214 connected thereto. In such embodiments, the nozzle head may be removably connected to the nozzle body (e.g., by being held in sealing contact with the nozzle body), or may be permanently attached thereto (e.g., via welding or soldering). As will be appreciated, although the nozzle body and nozzle head are shown as being separate pieces in this embodiment, in other embodiments, the nozzle body and nozzle head may be a single, integrally formed piece (e.g., formed via additive manufacturing).

As also shown in FIG. 2, the nozzle body and nozzle head may have different shapes and sizes. For example, the nozzle body may be substantially cylindrical in shape while the nozzle head is substantially rectangular in shape. The nozzle body also may be longer (e.g., about two times longer) than the nozzle head, although the nozzle body and nozzle head may be the same length in other embodiments. As shown in FIG. 2, in some embodiments, the nozzle heat 214 is wider than the nozzle body 212. As will be appreciated, the nozzle body and nozzle head may have other suitable arrangements in other embodiments.

Figure 4:
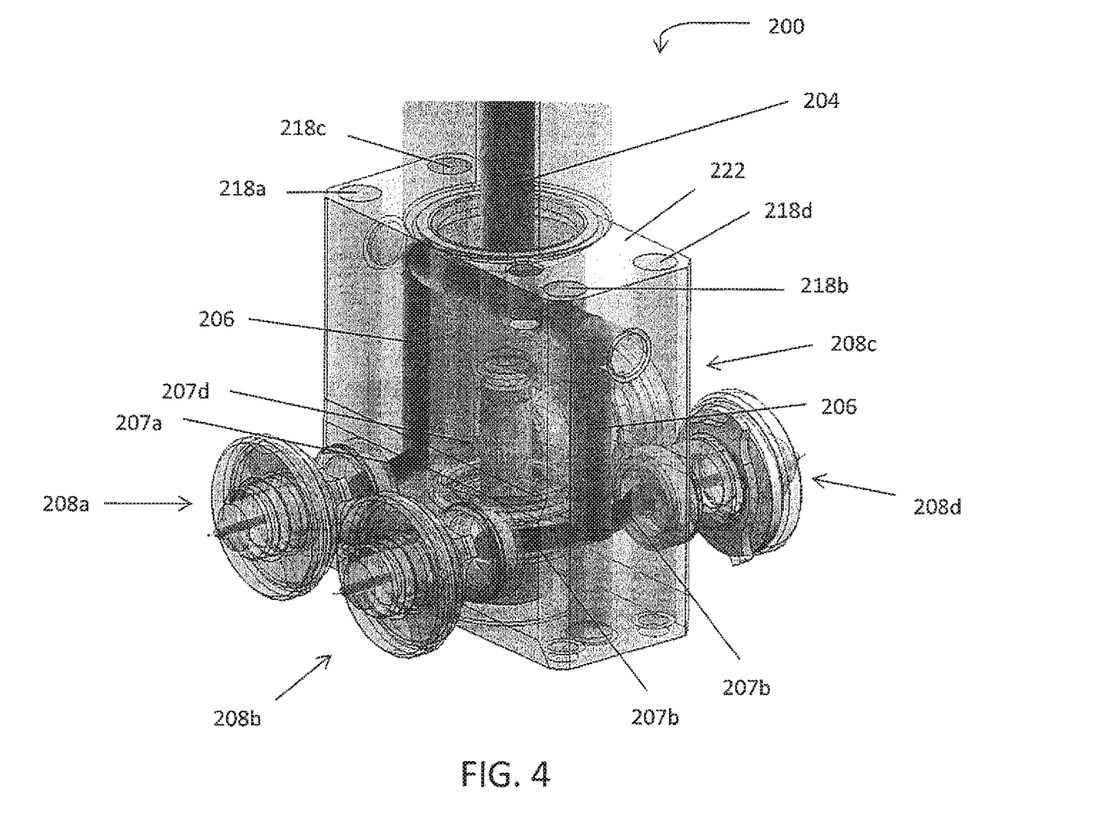
FIG. 4 is an enlarged perspective view of a portion of the nozzle of FIG. 2, without heaters attached to a nozzle head.

As shown in FIGS. 2 and 4, the nozzle 200 may include a cluster of nozzle tips 208a-208d attached to the nozzle head 214 for transferring melt to respective melt cavities (not shown). As will be appreciated, although four nozzle tips are attached to the nozzle head in this embodiment, more or fewer nozzle tips may be attached to the nozzle head. For example, in other embodiments, 2, 6, 8, 12 or more nozzle tips may be attached to the nozzle head. For purposes herein, being attached to the nozzle head may mean that the nozzle tips are permanently attached to the nozzle head. For example, the nozzle tips may be brazed, welded or otherwise permanently affixed to the nozzle head. The nozzle tips also may be removably attached to the nozzle head in other embodiments. For example, the nozzle tips may be removably threaded onto the nozzle head. In another example, the nozzle tips may be biased into sealing contact with the nozzle head via a biasing member, such as a spring, and a seal ring.

Figure 3:
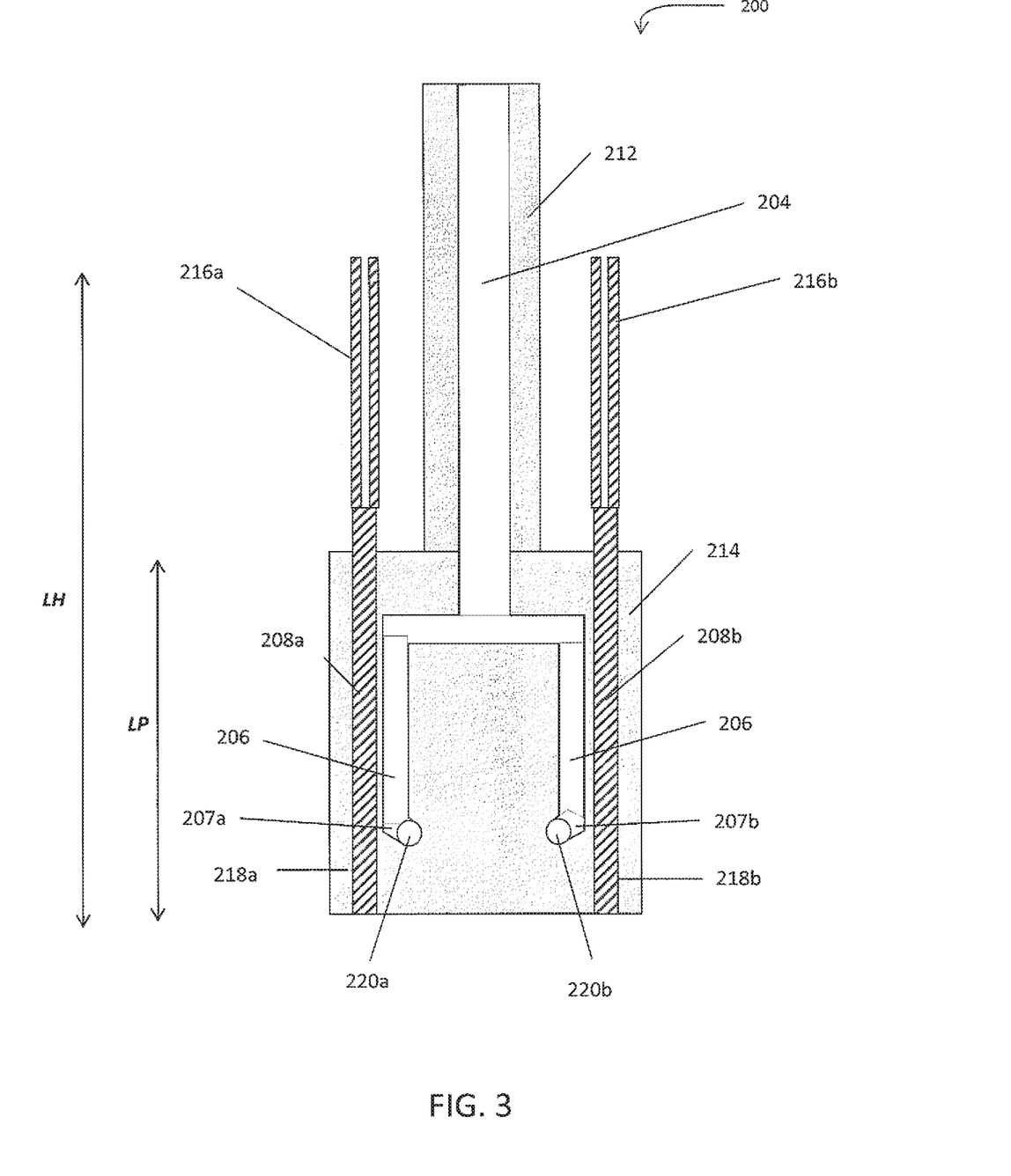
FIG. 3 is a cross-sectional schematic representation of a front view of the nozzle of FIG. 2.

As shown in FIGS. 3 and 4, the nozzle 200 may include a primary melt channel 204 that extends from the nozzle body 212 to the nozzle head 214, where it splits into downstream melt channels that pass melt to the mold cavities. For example, as shown in these views, the primary melt channel 204 may split into secondary melt channels 206, and further to tertiary melt channels 207a-207d, the tertiary melt channels transferring melt to respective melt tips 208a-208d.

Figure 6:
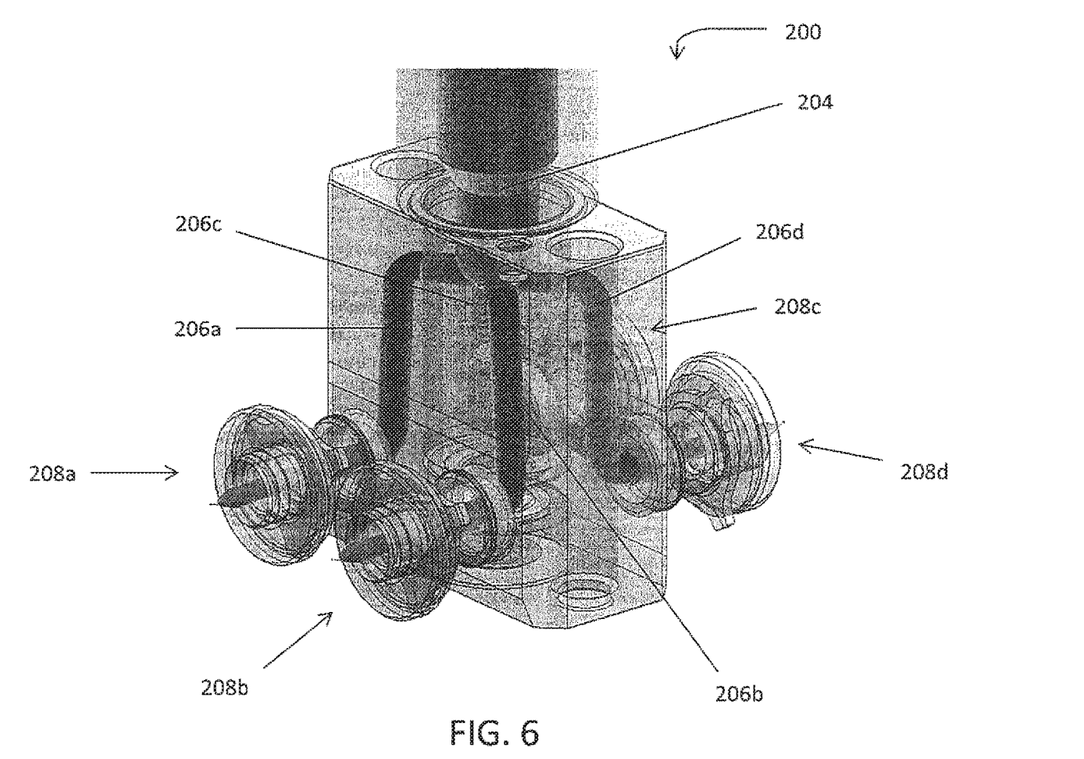
FIG. 6 is an enlarged perspective view of a portion of a side gate nozzle according to another embodiment, without heaters attached to a nozzle head.
Figure 7:
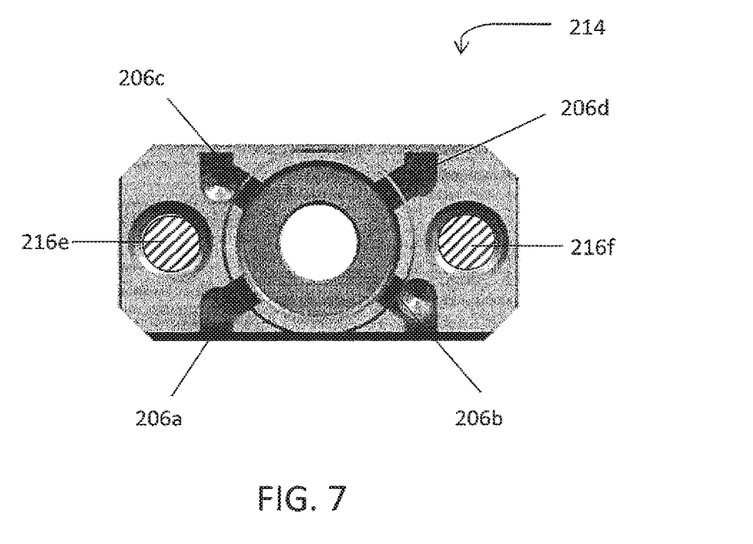
FIG. 7 is a top view of the nozzle head of FIG. 6, with heaters attached thereto.

Although the primary melt channel 204 extends into the nozzle head 214 in FIGS. 3 and 4, in other embodiments, the primary melt channel may extend in only the nozzle body 212. Additionally, although two secondary and four tertiary melt channels are present in the nozzle head in this embodiment, the nozzle head may have other configurations. For example, as shown in FIGS. 6-7, the nozzle head 214 may have only four secondary channels 206a-206d that feed melt to respective nozzle tips. The nozzle head also may have two secondary channels and more tertiary channels (e.g., 8, 12, or more tertiary channels) that feed melt to respective mold cavities. As will be appreciated, the melt channels in these embodiments may have any suitable configuration. For example, the melt channels may be substantially cylindrical. The melt channels also may be curved shape (e.g., may have an "S" shape).

According to one aspect of the present disclosure, and as shown in FIGS. 2 and 3, the nozzle head 214 may include a plurality of heaters to control tip temperature. For example, a heater may be associated with each nozzle tip and/or corresponding downstream channel. In some embodiments, heaters may be positioned locally to the downstream melt channels and/or the nozzle tip. Without wishing to be bound by theory, by being positioned locally to a corresponding melt channel and/or nozzle tip, heat may be provided to the melt travelling in the downstream channels and to the nozzle tip, such as via conductivity of adjacent metal parts. As shown in FIG. 3, for example, a first heater 208a is positioned locally to a secondary melt channel 206, a first tertiary channel 207a, and a nozzle tip 208a (attached at drop 220a), and a second heater 208b is positioned locally to a secondary melt channel 206, a second tertiary melt channel 207a, and a second nozzle tip 208b (attached at drop 220b). As will be appreciated, although each heater is positioned locally to secondary and tertiary melt channels and to the nozzle tip, in some embodiments, the heater may be positioned locally to only the melt channels or to only the nozzle tip, for example.

For purposes herein, being positioned locally to the melt channel may mean that the heater is adjacent to the melt channel in that the heater is closer to the respective secondary and tertiary melt channels than to any other respective secondary and tertiary melt channels. For example, in the views shown in FIG. 3-5, the first heater 216a is positioned closer to the downstream channels 206, 207a feeding the first nozzle tip 208a than to any other downstream channels feeding another nozzle tip (e.g., the secondary and tertiary channels 206, 207b feeding the second nozzle tip 208b). In such an example, the first heaters 216a, 216b is positioned adjacent to the secondary and tertiary melt channels and to the respective nozzle tip.

As will be appreciated, being positioned adjacent to the melt channel may mean that the heater is positioned immediately next to the melt channel such that there is little space between the outer surface of the melt channel and the heater. The heater also may be adjacent to the melt channel while being positioned a distance from the melt channel. As will be further appreciated, in embodiments in which the heater is adjacent to both secondary and tertiary melt channels, the heater need not be positioned equidistant between both channels. For example, the heater may be positioned closer to the tertiary melt channel than to the secondary melt channel while still being positioned locally to both the secondary and tertiary channels. In a similar fashion, the nozzle tip need not be located the same distance between an adjacent melt channel and an adjacent nozzle tip.

For purposes herein, being positioned locally to the nozzle tip may mean that the heater is positioned closer to a first nozzle tip than to any other nozzle tip. For example, in FIGS. 3-5, each heater is adjacent a respective nozzle tip (attached at respective drops 220a-220d). As with the above embodiments, such heaters may be positioned immediately adjacent to the nozzle tips or may be positioned at a distance from the nozzle tips. Additionally, the heater may be positioned closer to one nozzle tip than to an adjacent melt channel.

In some embodiments, each heater is located the same distance from the corresponding downstream melt channel(s) and the respective nozzle tip that receives melt therefrom. For example, the first heater may be equidistant between the secondary channel 206, the first tertiary channel 208a and the first nozzle tip 208a. In other embodiments, each heater may be positioned different distances from each. For example, the heater may be closer to the secondary melt channel than to the tertiary channel and/or nozzle tip.

Figure 5:
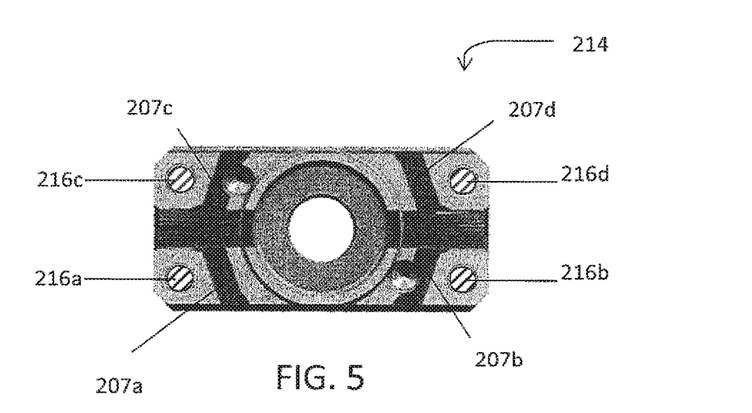
FIG. 5 is a top view of the nozzle head of FIG. 4, with heaters attached thereto.
Figure 8:
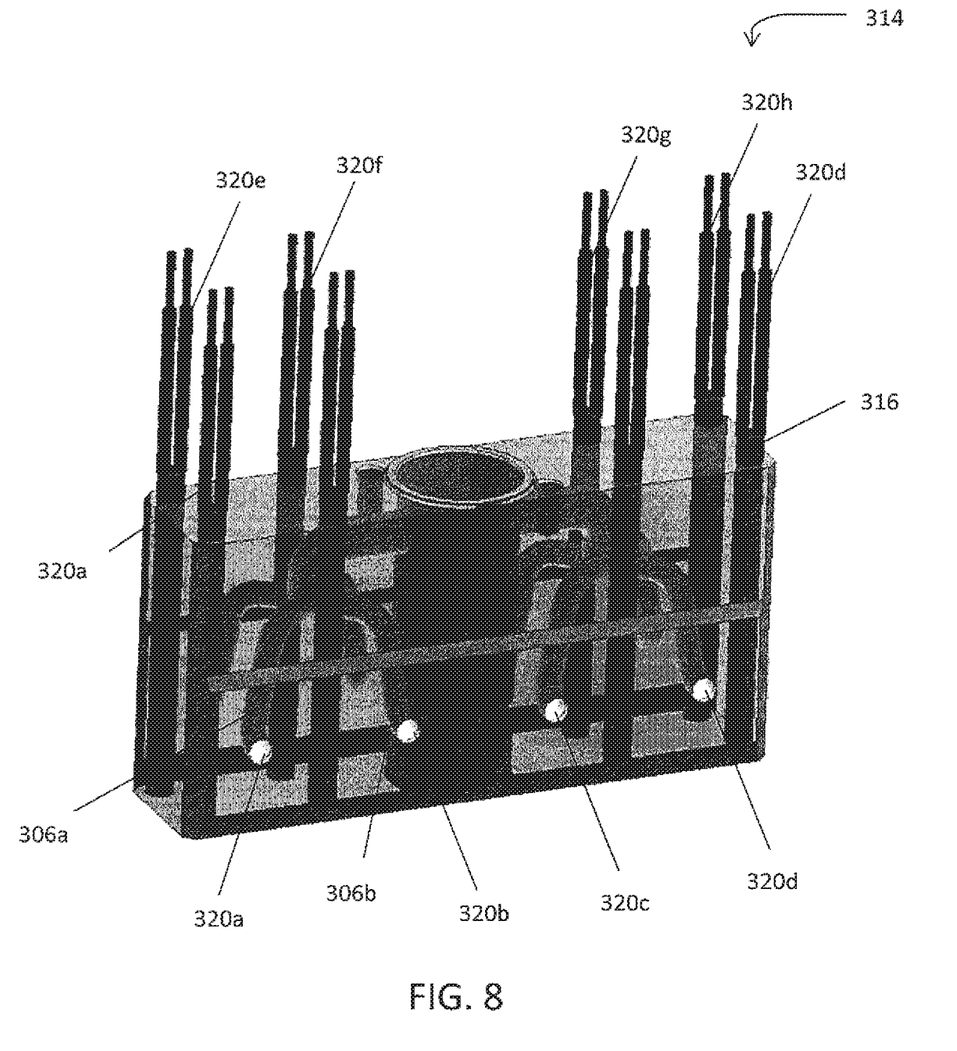
FIG. 8 is an enlarged perspective view of a nozzle head of a side gate nozzle according to another embodiment.
Figure 9:
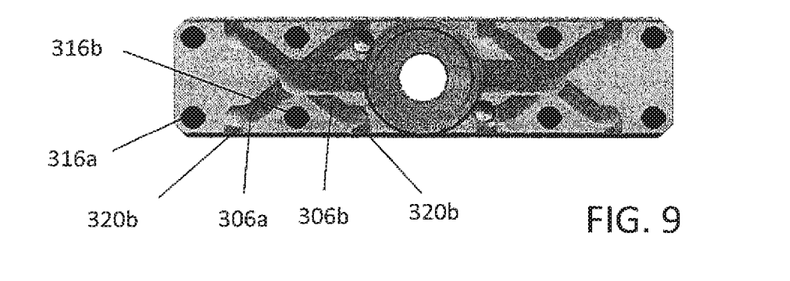
FIG. 9 is a top view of the nozzle head of FIG. 8.

As shown in FIGS. 3-5, in some embodiments, a heater may be associated with and positioned locally to the downstream channels and corresponding nozzle tips. As described, heaters 216a-216d are associated with and positioned locally to each of the tertiary melt channels 207a-207d and the respective nozzle tips 208a-208d. In other embodiments, a heater may be associated with a downstream channel and/or corresponding nozzle tip, but be positioned substantially equidistant between a first downstream channel and corresponding first nozzle tip and a second downstream channel and corresponding second nozzle tip. For example, as illustrated in FIG. 8, the nozzle head 314 has 8 nozzle tips attached at respective drops (drops 320a-320d visible in this view) and 8 heaters, with each heater being associated with a respective nozzle tip (and corresponding melt channel). However, as illustrated in FIGS. 8 and 9, the second heater 320b is positioned equidistant between the first nozzle tip (attached at drop 320a) and corresponding first secondary channel 306a and the second nozzle tip (attached at drop 320b) and corresponding second secondary channel 306b. As will be appreciated, in such embodiments, although being positioned equidistant between the first and second nozzle tips, the second heater 316b is arranged to provide heat to the second nozzle tip (attached at drop 320b) and the corresponding second melt channel 306b.

As further illustrated by FIGS. 8-9, in some embodiments, heaters may be associated with all of nozzle tips attached to a nozzle head, with some of the heaters positioned locally to some tips and other heaters positioned substantially equidistant between other tips. For example, although the second heater 306b is be positioned substantially equidistant between the first and second nozzle tips 308a, 308b in these views, the first heater 316a is positioned locally to the first nozzle tip and corresponding first secondary melt channel 306a.

Although embodiments have been shown and described in which a single heater is associated with each nozzle tip, in some embodiments a single, heater may be associated with more than one nozzle tip. For example, as shown in FIGS. 6-7, instead of having smaller heaters associated with and positioned locally to each of the second and fourth nozzle tips 208b, 208d, a single, larger heater 216f is positioned locally to these tips. In a similar fashion, a single, larger heater 216e is positioned locally to the first and third nozzle tips 208a, 208c. As will be appreciated, in such embodiments, the single heaters 216e, 216f are adjacent to the secondary channels and corresponding nozzle tips. For example, the first larger heater 216d is adjacent to the second and fourth secondary channels 206b, 206d and the second and third nozzle tips 208b, 208d.

Turning back to FIGS. 2-5, in which the heaters 208a-208d are attached to the nozzle head 214. In some embodiments, the heaters 208a-208d are slidably received in a respective heater passages 218a-218d formed in the nozzle head 214. In such embodiments, the heaters may be insertable into openings in an upstream end 222 of the nozzle head 214, the upstream end of the nozzle head being positionable at the downstream side of the nozzle body 212. As shown in FIG. 3, the heaters may be positioned away from an outer surface of the nozzle body 212.

As will be appreciated, the size and shape of the heater passage 218a-218d may correspond to the size and shape of the heater. For example, as shown in FIGS. 4 and 5, in embodiments in which the heater is cylindrical in shape, the heater passage may have a corresponding cylindrical shape. In some embodiments, only a portion of each heater is received in the respective heater passage. For example as shown in FIG. 3, a length of the heater passage LP is less than a length of the heater LH such that a portion of each heater extends outwardly from the nozzle head. In other embodiments, the length of the heater passage may be the same as the length of the heater such that an entire length of the heater is received in the heater passage. In some embodiments, the heaters may be held in contact with the heater passage (e.g., via a biasing member) or may be otherwise attached to the nozzle head. The heaters may be permanently or removably attached to the nozzle head.

In some embodiments, as is shown, the heater passages 218a-218d extend along an entire length of the nozzle head 214. That is, the heater passages extend between the upstream end 222 and the downstream end of the nozzle head. As will be appreciated, the heater passage need only be open at one such end (e.g., at the upstream end) to allow the heater to be slidably inserted into the heater passages 218a-218d. In some embodiments, heater passages may extend only partially along the length of the nozzle body. For example, the heater passages may extend only half way between the upstream end 222 and the downstream end of the nozzle body. In some embodiments, the heater passages may extends at least as far as the downstream-most position of the downstream channels.

Although the length of each heater is the same in these views, it will be appreciated that the heaters may have different sizes in other embodiments. In a similar fashion, although the length of each heater passage is the same in these views, the heaters passages may have different lengths in other embodiments. For example, if the melt channels extend to different vertical positions in the nozzle block, the length of the heaters used to heat some melt channels may differ than the length of the heaters used to heat melt in other melt channels.

Figure 10:
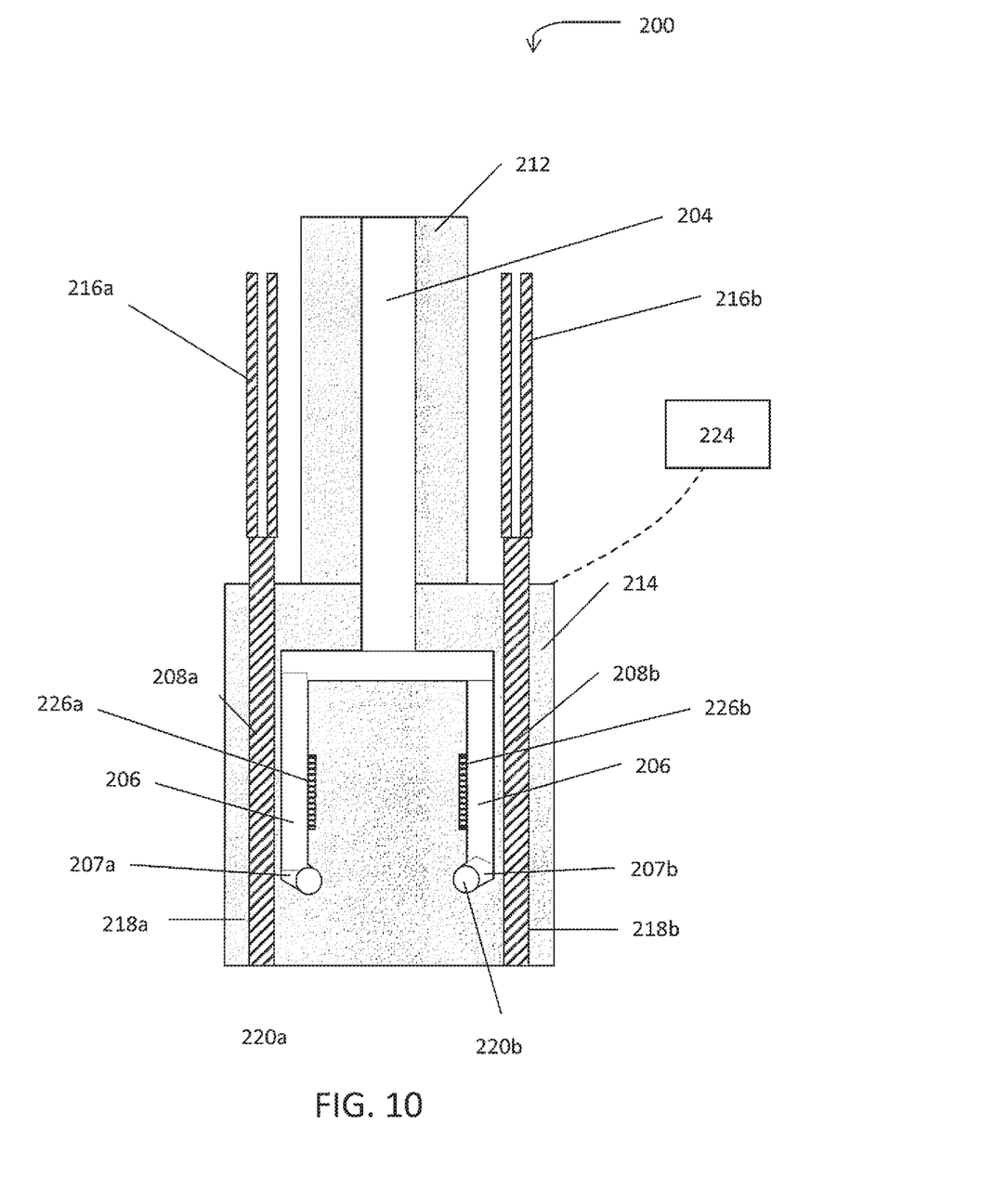
FIG. 10 is cross-sectional schematic representation of a front view of a side gate nozzle according to another embodiment.

Turning now to FIG. 10, in some embodiments, the nozzle 200 is operatively connected to a controller 224, which is arranged to control each of the heaters 216a, 216b disposed in the nozzle. For example, the controller may send a signal to increase the heat supplied to one of the heaters for a prescribed period of time (e.g., during the injection cycle). In some embodiments, the controller is directly connected to the heaters (i.e., wired), while in other embodiments, the controller is indirectly (e.g., wirelessly) connected to the heater. As will be appreciated, although the heaters are attached to a single controller, in other embodiments, each heater may be attached to its own controller such that the heaters of the same nozzle may be operatively connected to more than one controller.

In some embodiment, as also shown in FIG. 10, the nozzle 200 may include one or more temperature sensors, such as thermocouples 226a, 226b, that are arranged to measure the temperature of the melt in the downstream channels. For example, as is shown, thermocouples 226a, 226b may be located on an exterior surface of each of the secondary channels 206. Although the thermocouples are shown on only the secondary channels 206, in other embodiments, thermocouples may instead be positioned on each of the tertiary channels to measure the temperature of the melt prior to entering the respective nozzle tip. In some embodiments, the nozzle may include thermocouples on all of the downstream channels, such as on both the secondary and tertiary channels.

Figure 11:
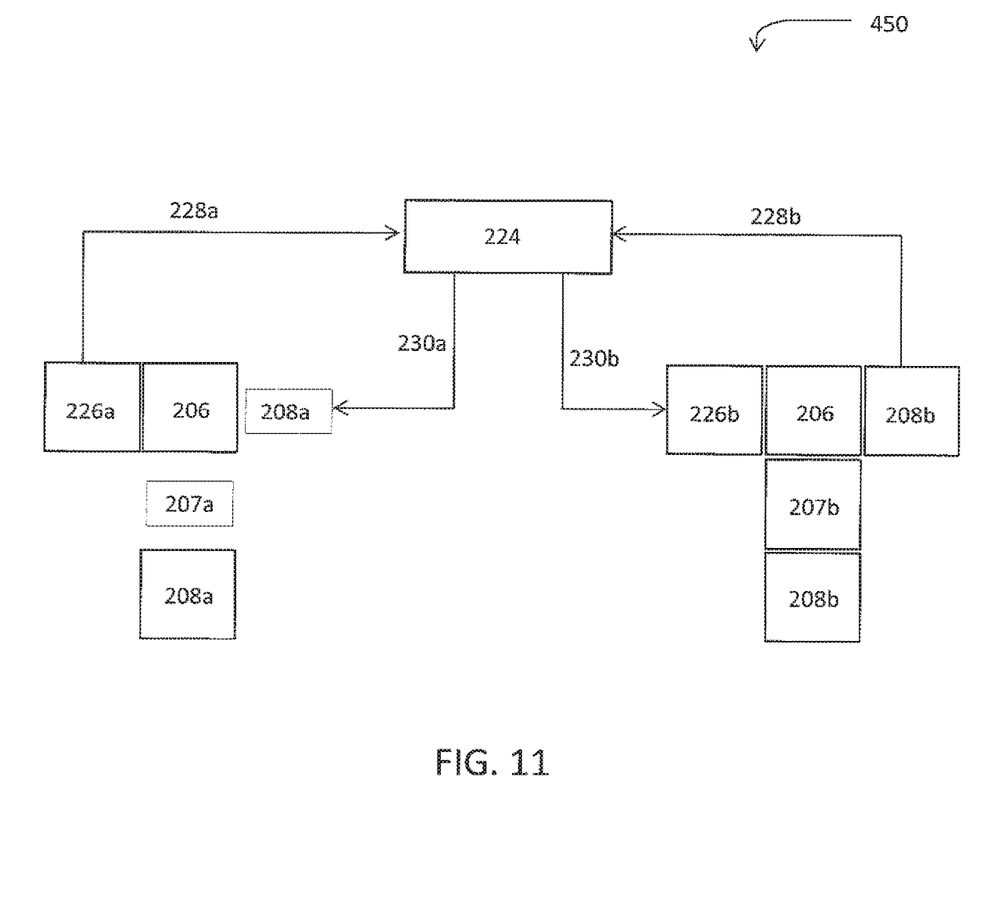
FIG. 11 is schematic representation of a control circuit for the nozzle of FIG. 10.

FIG. 11 illustrates a control circuit 450 that may be used with the nozzle 200 shown in FIG. 10. In some embodiments, as shown in this figure, the first thermocouple 226a may sense a temperature of the melt travelling in the secondary channel 206, and may send feedback including melt temperature information 228a to the controller 224. The controller, in response to this feedback, may send instructions 230a to the first heater 208a to increase or decrease the level of heat being supplied to the secondary channel. For example, if the temperature of the melt is below a prescribed temperature level, the prescribed value being an optimum processing temperature of the melt, the controller may instruct the first heater 208a to supply more heat to the secondary channel 206 to increase the temperature of the melt. In contrast, if the temperature of the melt is above the prescribed temperature, the controller 224 may instruct the first heater 208a to decrease the level of heat being supplied to the secondary channel. A similar feedback loop may be occur for each of the channels in edge gate nozzle. For example, as shown in FIG. 9, a second thermocouple 226b may sense a temperature of the melt in the secondary channel 206 and may send feedback to the controller 224, which, in turn, sends feedback to the second heater 208b.

Although embodiments have been disclosed in which heaters are only used to provide heat to the nozzle head it will be appreciated that the hot runner may include additional heaters in other embodiments. For example, one or more heaters may be positioned around the nozzle body to provide heat to melt travelling through the primary melt channel therein. In one such embodiment, one or more heaters may be located near a downstream end of the nozzle body to heat melt passing to the nozzle head.

Although embodiments have been shown with only one nozzle, it will be appreciated that injection molding machines may include more than one side gate nozzle. For example, the hot runner may include 2, 4, 6, 8, 12 of more such side gate nozzles. In such embodiments, each nozzle may include the same number of nozzle tips and heaters, although the number of nozzle tips and heaters may vary from nozzle to nozzle. In some embodiments, all of the nozzles may be connected to the same controller, which is arranged to individually control each of the heaters, as described. As will be appreciated, each nozzle also may be connected to an its own proprietary controller arranged to controller the heaters and tip temperature.

What is claimed is:

1. A side gate nozzle used in a hot runner for transferring melt to a mold cavity, the side gate nozzle comprising:
   a nozzle body having a primary melt channel for receiving melt from a manifold fluidly connected to the nozzle body;
   a nozzle head having a first secondary melt channel arranged to feed melt to a first nozzle tip and a second secondary melt channel arranged to feed melt to a second nozzle tip, each of the first and second nozzle tips being fluidly connected to the nozzle head and being arranged in a cluster, the first and second secondary melt channels being in fluid communication with the primary melt channel;

two or more heaters disposed in the nozzle head, wherein a first heater is adjacent to the first secondary melt channel and a second heater is adjacent to the second secondary melt channel, the first heater being positioned closer to the first secondary melt channel than to the second secondary melt channel.

2. The hot runner of claim 1, further comprising a first tertiary melt channel arranged to transfer melt from the first secondary melt channel to the first nozzle tip, wherein the first heater is adjacent to the first tertiary melt channel.

3. The hot runner of claim 1, wherein the first heater is adjacent the first nozzle tip.

4. The hot runner of claim 1, wherein the second heater is adjacent the second nozzle tip.

5. The hot runner of claim 1, further comprising a controller operatively coupled to the nozzle, the controller arranged to control each of the first and second heaters.

6. The hot runner of claim 5, further comprising a first temperature sensor positioned proximal to the first secondary melt channel and a second temperature sensor positioned on the second secondary melt channel, the first and second temperature sensors arranged to send feedback including melt temperature information to the controller.

7. The hot runner of claim 1, wherein the nozzle head comprises first and second heater passage, the first heater being slidably disposed in the first heater passage, the second heater being slidably disposed in the second heater passage, wherein each of the first and second heater passages includes an opening formed in an upstream side of the nozzle head, the first and second heaters being inserted into respective openings of the first and second heater passages.

8. The hot runner of claim 1, wherein the first heater is attached to the nozzle head and wherein the second heater is attached to the nozzle head.

9. The hot runner of claim 1, wherein a length of the first heater is greater than a length of the first heater passage and wherein a length of the second heater is greater than a length of the second heater passage.

10. A side gate nozzle used in a hot runner for transferring melt to a mold cavity, the side gate nozzle comprising:

a nozzle body having a primary melt channel for receiving melt from a manifold fluidly connected to the nozzle body;

a nozzle head having a first secondary melt channel arranged to feed melt to a first nozzle tip and a second secondary melt channel arranged to feed melt to a second nozzle tip, each of the first and second nozzle tips being fluidly connected to the nozzle head and being arranged in a cluster, the first and second secondary melt channels being in fluid communication with the primary melt channel;

two or more heaters disposed in the nozzle head, wherein a first heater is adjacent to the first nozzle tip and a second heater is adjacent to the secondary nozzle tip, the first heater being positioned closer to the first nozzle tip than to the second nozzle tip.

11. The hot runner of claim 10, further comprising first and second tertiary channels, the first tertiary melt channel arranged to pass melt from the first secondary melt channel to the first nozzle tip and the second tertiary melt channel arranged to pass melt from the second secondary melt channel to the second nozzle tip.

12. The hot runner of claim 10, wherein the second heater is positioned closer to the second nozzle tip than to the first nozzle tip.

13. The hot runner of claim 10, further comprising a controller operatively coupled to the nozzle, the controller arranged to control each of the first and second heaters.

14. The hot runner of claim 13, further comprising a first temperature sensor positioned proximal to the first secondary melt channel and a second temperature sensor positioned on the second secondary melt channel, the first and second temperature sensors arranged to send feedback including melt temperature information to the controller.

15. A side gate nozzle used in a hot runner for transferring melt to a mold cavity, the side gate nozzle comprising:

a nozzle body having a primary melt channel for receiving melt from a manifold;

a nozzle head having a first secondary melt channel arranged to feed melt to a first nozzle tip and a second secondary melt channel arranged to feed melt to a second nozzle tip, each of the first and second nozzle tips being fluidly connected to the nozzle head and being arranged in a cluster; and two or more heaters disposed in the nozzle head, wherein a first heater is associated with the first nozzle tip and a second heater is associated with the second nozzle tip;

wherein the first and second heaters are operatively connected to one or more controllers such that the first and second heaters are individually controllable.

16. The side gate nozzle of claim 15, wherein the first heater is associated with the first secondary melt channel.

17. The hot runner of claim 15, further comprising a first temperature sensor positioned on the first secondary melt channel and a second temperature sensor positioned on the second secondary melt channel, the first and second temperature sensors arranged to send feedback including melt temperature information to the one or more controller.

18. The hot runner of claim 17, wherein the first temperature sensor is arranged to send feedback to a first controller, the first controller arranged to send instructions to the first heater to adjust melt temperature of the first secondary melt channel.

* * * * *